United States Patent
Graziano et al.

(10) Patent No.: US 10,880,261 B2
(45) Date of Patent: Dec. 29, 2020

(54) PERSONAL WEB ADDRESS MANAGEMENT SYSTEM

(71) Applicant: Postalytics, Inc., Rockland, MA (US)

(72) Inventors: Alexander Graziano, Scituate, MA (US); Dennis Kelly, Hingham, MA (US)

(73) Assignee: Postalytics, Inc., Rockland, MA (US)

( * ) Notice: Subject to any disclaimer, the term of this patent is extended or adjusted under 35 U.S.C. 154(b) by 0 days.

(21) Appl. No.: 15/951,122

(22) Filed: Apr. 11, 2018

(65) Prior Publication Data

US 2019/0058687 A1    Feb. 21, 2019

Related U.S. Application Data

(60) Provisional application No. 62/484,227, filed on Apr. 11, 2017.

(51) Int. Cl.
| | |
|---|---|
| H04L 29/12 | (2006.01) |
| H04L 29/08 | (2006.01) |
| G06F 16/958 | (2019.01) |
| G06F 16/955 | (2019.01) |

(52) U.S. Cl.
CPC ............ *H04L 61/20* (2013.01); *G06F 16/955* (2019.01); *G06F 16/972* (2019.01); *H04L 67/22* (2013.01); *H04L 61/6018* (2013.01)

(58) Field of Classification Search
CPC ....... H04L 61/20; H04L 67/22; G06F 16/955; G06F 16/972
See application file for complete search history.

(56) References Cited

U.S. PATENT DOCUMENTS

| | | |
|---|---|---|
| 7,177,822 B2 | 2/2007 | Mahmood et al. |
| 7,624,173 B2 * | 11/2009 | Bary ............... G06F 16/958 709/224 |
| 7,680,882 B2 | 3/2010 | Tiu, Jr. et al. |
| 8,200,761 B1 | 6/2012 | Tevanian |
| 9,357,277 B1 | 5/2016 | Nijim et al. |

(Continued)

FOREIGN PATENT DOCUMENTS

| | | |
|---|---|---|
| WO | WO 2007/062026 A2 | 5/2007 |
| WO | WO 2007/150055 A2 | 12/2007 |
| WO | WO 2016/065285 A1 | 4/2016 |

OTHER PUBLICATIONS

U.S. Appl. No. 14/883,062, filed Oct. 14, 2015, Graziano.
(Continued)

*Primary Examiner* — Sargon N Nano
*Assistant Examiner* — Christopher B Robinson
(74) *Attorney, Agent, or Firm* — Wolf, Greenfield & Sacks, P.C.

(57) ABSTRACT

It is realized that improved processes and systems for delivering personal web content are needed. Various aspects and embodiments are related to systems and methods to provide personalized web content for users accessing a personal web addresses. Some embodiments relate to systems and methods of generating personal web addresses and redirecting associated users to a landing page, and generating personalized web content for users on the landing page. Some embodiments relate to systems and methods of tracking activity of a user and associating the activity with a known identify of the user.

15 Claims, 16 Drawing Sheets

(56) References Cited

U.S. PATENT DOCUMENTS

| | | |
|---|---|---|
| 2003/0096625 A1 | 5/2003 | Lee et al. |
| 2004/0085362 A1 | 5/2004 | Sauermann et al. |
| 2004/0117400 A1 | 6/2004 | Mccrystal et al. |
| 2004/0225564 A1 | 11/2004 | Walsh |
| 2006/0095422 A1* | 5/2006 | Kikuchi ................ G06F 16/957 |
| 2007/0011240 A1 | 1/2007 | Altberg et al. |
| 2007/0094082 A1 | 4/2007 | Yruski et al. |
| 2007/0121846 A1 | 5/2007 | Altberg et al. |
| 2007/0168256 A1* | 7/2007 | Horstmann ........ G06Q 30/0277 705/14.67 |
| 2008/0065730 A1 | 3/2008 | Wilson |
| 2008/0086369 A1 | 4/2008 | Kiat et al. |
| 2008/0147810 A1 | 6/2008 | Kumar et al. |
| 2008/0195466 A1 | 8/2008 | Wright |
| 2008/0195475 A1 | 8/2008 | Lambert et al. |
| 2008/0195665 A1 | 8/2008 | Mason |
| 2009/0063232 A1 | 3/2009 | Lissack et al. |
| 2009/0249384 A1 | 10/2009 | Fang et al. |
| 2009/0271259 A1 | 10/2009 | Fish |
| 2009/0313116 A1 | 12/2009 | Ashbaugh |
| 2010/0100545 A1 | 4/2010 | Jeavons |
| 2010/0318407 A1 | 12/2010 | Leff et al. |
| 2011/0010242 A1 | 1/2011 | Blaser et al. |
| 2011/0055683 A1* | 3/2011 | Jiang ..................... G06F 16/957 715/234 |
| 2011/0066689 A1 | 3/2011 | Olsson et al. |
| 2011/0071906 A1 | 3/2011 | Kamiyama et al. |
| 2012/0036051 A1 | 2/2012 | Sachson |
| 2012/0101938 A1 | 4/2012 | Kasower |
| 2012/0266219 A1 | 10/2012 | Coleman et al. |
| 2012/0303467 A1 | 11/2012 | Farmer |
| 2012/0324027 A1 | 12/2012 | Vaynblat et al. |
| 2013/0073745 A1 | 3/2013 | Bilinski et al. |
| 2013/0325671 A1 | 12/2013 | Glass et al. |
| 2014/0143337 A1 | 5/2014 | McIntosh et al. |
| 2014/0164613 A1 | 6/2014 | Mason et al. |
| 2015/0180733 A1* | 6/2015 | Krutzler .................. H04L 67/04 709/219 |
| 2016/0104191 A1 | 4/2016 | Graziano |
| 2016/0104213 A1 | 4/2016 | Graziano |

OTHER PUBLICATIONS

U.S. Appl. No. 14/921,700, filed Oct. 23, 2015, Graziano.

PCT/US2015/055563, Jan. 11, 2016, International Search Report and Written Opinion PCT/US2015/057157, Jan. 12, 2016, International Search Report and Written Opinion.

International Search Report and Written Opinion dated Jan. 11, 2016 in connection with International Application No. PCT/US2015/055563.

International Search Report and Written Opinion dated Jan. 12, 2016 in connection with International Application No. PCT/US2015/057157.

Boldt, When Do Personalized URLs Work in Direct Marketing Campaigns? Target Marketing. Apr. 13, 2011. (serial online). <http://www.targetmarketingmag.com/article/personalized-urls-purls-effective-direct-marketing-campaigns/all/>entire document. Last accessed Sep. 6, 2016.

[No Author Listed], Bulk personalized URL shortening. IP.com. Oct. 27, 2013; 6 pages.

* cited by examiner

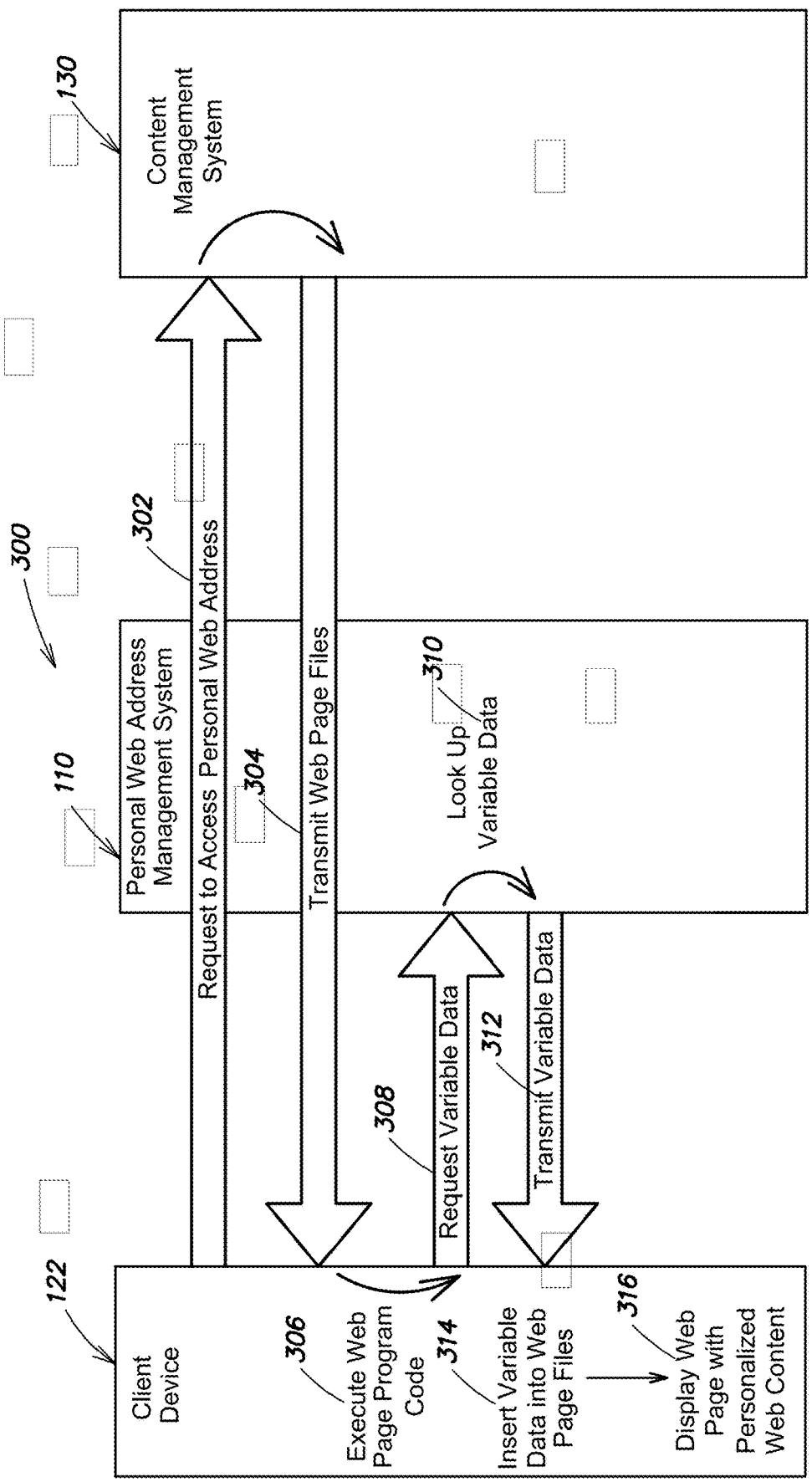

| Target User Code 402 | First Name 404 | Last Name 406 | Last Product Purchased 410 | State 412 | Zip 414 | Personal Web Address 408 |
|---|---|---|---|---|---|---|
| 00001 | John | Smith | Football | KS | 53558 | jsmith1.domainname.com |
| 00002 | Michael | Johson | Frisbee | GA | 24456 | mjohnson1.domainname.com |
| 00003 | Michael | Jordan | Shoes | IL | 48946 | mjordan1.domainname.com |
| 00004 | Tom | Brady | Vitamins | MA | 51683 | tbrady1.domainname.com |
| 00005 | Aaron | Rodgers | Belt | WI | 89465 | arodgers1.domainname.com |
| 00006 | Joe | Flacco | Laptop | MD | 47565 | jflacco1.domainname.com |
| 00007 | Drew | Brees | Diapers | LA | 784632 | dbrees1.domainname.com |

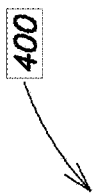

```
<article id="post-253" class="post-253 page type-page status-publish hentry">
    <div class="entry-content">
        <h1>Variable Data Testing</h1>

<h2>Hi %FirstName%</h2>
<p>This is a test to see about dynamic replacement</p>
<p>First: %FirstName%<br />
Last: %LastName%<br />
City: %City%<br />
State: %State%<br />
Zip: %Zip%</p>
<p>Var1: %VarField1%</p>
<hr />
<p>Lets try it in a form as well<br />
First <input type="text" value="%FirstName%" /><br />
Last <input type="text" value="%LastName%" /><br />
Email <input type="text" value="%EmailId%" /></p>
<p><input name="Thanks %FirstName%" type="submit" value="Thanks %FirstName%" /></p>
<p> </p>
<hr />
```

FIG. 6A

```
<h1>Variable Logic Testing</h1>
<p>Testing % FirstName % == ‘ELIZABETH’<br />
{{if (‘%FirstName%’ == ‘ELIZABETH’)}}<br />
Your name is %FirstName%!!!<br />
{{endif}}</p>
<p> </p>
<hr />
<p>Testing 1==1<br />
{{if (1==1)}}<br />
One is equal to one to print out some stuff here<br />
<img src="https://cdn3.iconfinder.com/data/icons/simplius-pack/512/calculator-512.png" width="150" /><br />
{{endif}}</p>
<p> </p>
<hr />
```

Variable Logic Testing

Testing is Firstname is == "ELIZABETH"

712

Your name is ELIZABETH!!!

Testing 1==1

One is equal to one to print out some stuff here

Testing 1<4

One is less than four!

Testing 1>4

Testing 1<=1

One less than or equal to 1
Email: denise@testing.net.com

PERSONAL WEB ADDRESS MANAGEMENT SYSTEM

RELATED APPLICATIONS

This Application is a Non-Provisional of Provisional (35 USC 119(e)) of U.S. Application Ser. No. 62/484,227, entitled "PERSONAL WEB ADDRESS MANAGEMENT SYSTEM", filed on filed Apr. 11, 2017 which is herein incorporated by reference in its entirety.

BACKGROUND

A user may select a link that causes an Internet browser application to navigate to a landing web page (e.g., a landing page). The landing page, when displayed by the browser application, may display information to the user. Conventional methods and systems for directing users to landing pages and managing content on landing pages are limited.

SUMMARY

It is realized that improved processes and systems for delivering personal web content are needed. Stated broadly, various aspects and embodiments are related to systems and methods to provide personalized web content for users accessing a personal web addresses. Some embodiments relate to systems and methods of generating personal web addresses and redirecting associated users to a landing page. Some embodiments relate to systems and methods of generating personalized web content for users on the landing page. Some embodiments relate to systems and methods of tracking activity of a user and associating the activity with a known identify of the user.

According to one aspect, it is appreciated that there are drawbacks and challenges associated with generating personalized web content for users. In particular, the creation of microsites and other customized content involved in web-related marketing is significant and requires storage space, creative effort and programming resources to create such content. Another challenge is tracking web activity of a known user. Some aspects described herein provide tools that permit common website content to be customized for certain target users that are provided a personal web address (e.g., a personal uniform record locator (PURL)) to identify the user and render customized content for that user. Additional aspects described herein provide tools for tracking activity of a specific known user.

According to one aspect a system is provided. The system comprises: at least one processor configured to: generate a personal web address associated with a target user, wherein the personal web address leads to a web page; store variable data associated with the personal web address, the variable data comprising at least one value of at least one attribute associated with the target user; receive, from a client device accessing the web page via the personal web address, a request for at least a portion of the variable data associated with the personal web address, the portion of the variable data including the at least one value of the at least one attribute; identify, responsive to receiving the request, the stored variable data associated with the personal web address; and transmit the requested portion of the variable data to the client device, wherein the web page, when displayed by the client device, includes web content personalized for the target user, the web content personalized based on the transmitted portion of the variable data.

According to one embodiment, the at least one processor is further configured to generate a set of program code that, when executed by the client device, causes the client device to generate the web content personalized for the target user using the at least one value of the at least one attribute. According to one embodiment, the at least one processor is further configured to: receive input specifying instructions on how to generate the web content personalized for the target user; and generate the set of program code based on the received instructions. According to one embodiment, the at least one processor is further configured to insert the set of program code into a set of web page code that, when executed by the client device, causes the client device to display the web page.

According to one embodiment, the at least one processor is further configured to receive data indicating activity of the target user. According to one embodiment, the at least one processor is further configured to: generate a set of program code that, when executed by the client device, collects the data indicating activity of the target user. According to one embodiment, the at least one processor is further configured to store an association of the data indicating activity of the target user with an identity of the target user based on the personal web address. According to one embodiment, the at least one processor is further configured to determine, using the data, one or more of the following about the target user: a record of visited web pages that initiated from the web page, a frequency of visiting at least one visited web page, or a length of time spent on the at least one visited web page.

According to one embodiment, the at least one processor is further configured to accept a conversion URL that, when accessed by the client device from the web page, indicates that the target user has been converted.

According to one embodiment, the at least one processor is further configured to generate a respective personal web address for each of a plurality of target users, wherein the respective personal web address leads to the web page, wherein the web page, when displayed by the client device, includes web content personalized for a corresponding one of the plurality of target users.

According to another aspect, a computer-implemented method is provided. The method comprises acts of: generating a personal web address associated with a target user, wherein the personal web address leads to a web page; storing variable data associated with the personal web address, the variable data comprising at least one value of at least one attribute associated with the target user; receiving, from a client device accessing the web page via the personal web address, a request for at least a portion of the variable data associated with the personal web address, the portion of the variable data including the at least one value of the at least one attribute; identifying, responsive to receiving the request, the stored variable data associated with the personal web address; and transmitting the requested portion of the variable data to the client device, wherein the web page, when displayed by the client device, includes web content personalized for the target user, the web content personalized for the target user based on the transmitted portion of the variable data.

According to one embodiment, the method further comprises generating a set of program code that, when executed by the client device, causes the client device to generate the web content personalized for the target user using the at least one value of the at least one attribute. According to one embodiment, the method further comprises receiving input specifying instructions on how to generate the web content personalized for the target user; and generating the set of program code based on the received instructions. According to one embodiment, the method further comprises inserting the set of program code into a set of web page code that, when executed by the client device, causes the client device to display the web page.

According to one embodiment, the method further comprises receiving data indicating activity of the target user. According to one embodiment, the method further comprises generating a set of program code that, when executed by the client device, collects the data indicating the activity of the target user. According to one embodiment, the method further comprises storing an association of the data indicating activity of the target user with an identify of the target user based on the personal web address. According to one embodiment, the method further comprises determining, using the data, one or more of the following about the target user: a record of visited web pages that initiated from the web page, a frequency of visiting at least one visited web page, or a length of time spent on the at least one visited web page.

According to another aspect, at least one non-transitory computer readable medium storing processor-executable instructions is provided. The instructions when executed by the at least one processor cause the at least one processor to perform a method comprising: generating a personal web address associated with a target user, wherein the personal web address leads to a web page; storing variable data associated with the personal web address, the variable data comprising at least one value of at least one attribute associated with the target user; receiving, from a client device accessing the web page via the personal web address, a request for at least a portion of the variable data associated with the personal web address, the portion of the variable data including the at least one value of the at least one attribute; identifying, responsive to receiving the request, the stored variable data associated with the personal web address; and transmitting the requested portion of the variable data to the client device, wherein the web page, when displayed by the client device, includes web content personalized for the target user, the web content personalized for the target user based on the transmitted portion of the variable data.

According to one embodiment, the method further comprises generating a set of program code that, when executed by the client device, causes the client device to generate the web content personalized for the target user using the at least one value of the at least one attribute; and inserting the set of program code into a set of web page code that, when executed by the client device, causes the client device to display the web page.

According to another aspect, a system is provided. The system comprises: at least one processor; a user interface component, executed by the at least one processor, configured to: generate a first user interface screen, the first user interface screen configured to: receive a specification of a set of instructions defining a personalization of a web page accessed via a personal web address for a target user associated with the personal web address; wherein the at least one processor is configured to: receive the set of instructions defining the customization of the web page; and generate a set of program code based on the set of instructions defining the personalization of the web page for the target user, wherein the program code, when executed by a client device, causes the client device to display the web page in accordance with the received instructions defining the personalization of the web page for the target user.

According to one embodiment, the first user interface screen is configured to: receive instructions defining personalized content in the web page based on variable data associated with the personal web address. According to one embodiment, the first user interface screen is configured to: receive instructions including one or more strings representing one or more variables of the variable data, wherein the program code, when executed by the client device, accesses stored values of the one or more variables using the one or more strings.

According to one embodiment, generating the set of program code comprises Javascript code. According to one embodiment, the first user interface screen is configured to: receive an indication of a location in the web page at which to display personalized content when the web page is displayed by the client device. According to one embodiment, the user interface component is configured to generate a second user interface screen, the second user interface screen configured to: display the set of program code generated based on the set of instructions defining the personalization of the web page. According to one embodiment, the second user interface screen is configured to allow copying of the generated set of program code.

According to one embodiment, the first user interface screen is configured to receive a conditional statement specifying personalized content in the web page based on values of one or more variables associated with the personal web address.

According to another aspect, a system is provided. The system comprising: at least one processor configured to: accept and store a list specifying a plurality of target users to be directed to a web page to receive personalized web content; accept and store a plurality of values of a plurality of attributes associated with at least one target user of the plurality of target users, and generate a personal web address for the at least one target user, wherein the personal web address leads the at least one target user to the web page including the personalized web content, and a routing component, executed by the at least one processor, configured to: receive, from a client device, a request to access the personal web address, direct, responsive to receiving the request, the client device to the web page, receive, from the client device, a request for variable data associated with the at least one target user, identify, responsive to receiving the request, stored variable data associated with the at least one target user, the stored variable data including a value of at least one attribute of the plurality of attributes, and transmit the identified variable data to the client device for insertion into the web page wherein the web page, when displayed by a browser program executing on the client device using the variable data, includes the personalized web content for the at least one target user.

According to one embodiment, the system further comprises a personalization component, executed by the at least one processor, configured to: receive instructions to generate the personalized web content for the at least one target user based on at least a portion of the variable data, and insert a set of program code into the web page wherein the set of program code, when executed by the browser program executing on the client device, generates the personalized web content according to the received instructions.

According to one embodiment, the personalization component is further configured to generate program code that implements instructions to determine the personalized web content based on the value of the at least one attribute.

According to one embodiment, the personalization component is further configured to generate program code that implements instructions to insert the value of the at least one attribute on the web page.

According to one embodiment, the system further comprises a tracking component, executed by the at least one processor, configured to: generate a set of program code to be included in the web page wherein the set of program code, when executed by the browser program executing on the client device: generates the request for the variable data associated with the at least one target user, inserts received variable data into the web page, and collects data indicating activity of the at least one target user on the web page, and generate a unique identification code for the at least one target user.

According to one embodiment, the tracking component is further configured to determine, using the collected data, at least one of the following about the at least one target user: a record of visited web pages, a frequency of visiting at least one visited web page, and a length of time spent on the at least one visited web page.

According to one embodiment, the tracking component is further configured to send a notification to a member associated with the web page in response to detecting a specific action of the at least one target user on the web page accessed via the personal web address.

According to one embodiment, the tracking component is further configured to send a communication to the at least one target user responsive to detecting a specific user action on the web page accessed via the personal web address.

According to one embodiment, the at least one processor is further configured to accept a conversion URL, that when accessed by the client device from the personal web address, indicates that the at least one target user has been converted.

According to one embodiment, the system further comprises at least one API to receive the plurality of values of the plurality of attributes.

According to one embodiment, the personalization component is adapted to insert the set of program code into the web page within an interface of a content management system.

According to one embodiment, the web page is an adaptable web page common to a plurality of users, and wherein the personalization component is adapted to create the adaptable web page that, when displayed by the browser program executing on the client device that requested access to the personal web address, displays the personalized web content responsive to the identified personal web address.

According to one embodiment, the tracking component is further configured to generate the set of program code wherein the set of program code, when executed by the browser program executing on the client device, further includes the unique identification code in the generated request.

According to one embodiment, the routing component is further configured to identify the stored variable data associated with the at least one target user using the unique identification code.

Other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment.

References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment or example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 3A-B are a system flow diagram illustrating an example process of providing a user accessing a web page through a personal web address with personalized web content in accordance with some embodiments described herein;

FIG. 4 illustrates example target user and attribute information;

FIG. 6A is an example of generated code that displays variable data on a web page in accordance with some embodiments described herein;

FIG. 7A is an example of generated code that generates web page content based on values of variable data in accordance with some embodiments described herein;

DETAILED DESCRIPTION

Figure 1:
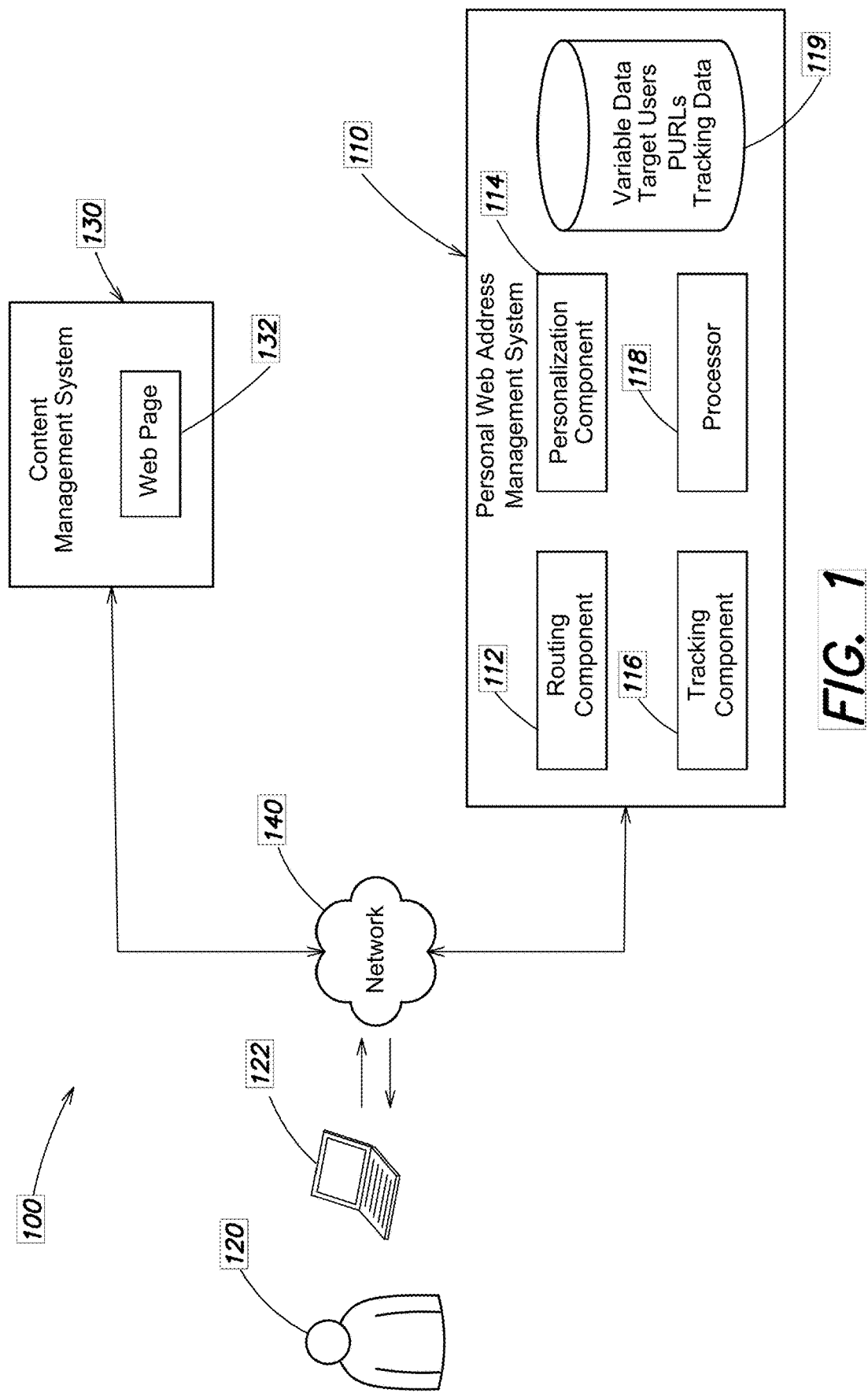
FIG. 1 is a block diagram of an example environment for personal web address interactions.

Various embodiments offer a personal web address management system that allows content providers to easily provide personalized web content to large numbers of target users using existing web pages. For example, the provider can specify an existing landing page where the provider wants to display personalized web content to the user. Various embodiments are directed to a system that generates personal web addresses such as personal uniform record locators (PURL) for a received list of target users that direct the users to an existing landing page. According to one aspect, a system is provided to implement instructions provided from a content provider for personalizing web content according to values of attributes associated with a user who is associated with a personal web address in order to create an adaptable web page that provides personalized web content to the user. The system may be configured to identify a personal web address linked to a target user, retrieve associated variable data containing values of attributes of the target user, and include values in web page files of the landing web page to provide a personalized web page to the user. Some embodiments described herein improve significantly over existing systems that rely on creating and maintaining several websites to provide personalized content to various users.

According to some embodiments, storage efficiency is vastly improved over conventional systems and methods. Some embodiments described herein eliminate the need for content providers to produce and store thousands of web sites for thousands of target users in order to provide them with personalized web content. Various aspects provide for a system that makes existing web pages adaptable for providing personalized web content. This eliminates storage and computational resources required to store and display many different websites. For example, conventional systems may require storing, developing, and maintaining of many (e.g., thousands) of web pages, each of which is associated with an individual in order to provide personalized web content to the individual. In some embodiments, by making existing web pages adaptable such that the web pages can provide personalized web content, the system eliminates a need to store, develop, and/or maintain individual web pages for different users that include personalized web content.

The inventors have recognized that conventional systems that collect data indicating activity of a user on the Internet are unable to determine an identity of the user and/or map the activity to a particular user. Without knowing an identity of a user whose activity is being tracked, conventional systems are unable to use data about the user's activity. For example, conventional systems are unable to determine and provide personalized and targeted web content to the user based on the collected data. Other systems may use computationally expensive methods to identify a user such as pattern recognition or machine learning.

According to some aspects, systems and methods are provided with an ability to track activity of one or more users and to associate an identity with the activity of the user(s). In some embodiments, the system is configured to enable collection of data indicating user activity for specific known users. For example, the system may be configured to associate data indicating user activity with an identity of a user. By having knowledge of the identity of a user whose activity is being tracked, the system enables content providers to use collected data indicating user activity to determine and/or provide more personalized and targeted content to users of hosted web pages.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates a block diagram of an example system 100 in which various digital interactions involving personal web addresses (e.g. PURLs) may take place. In this example, the system 100 includes a personal web address management system 110, a user 120 along with a user device 122, a content management system 130, and a network 140. The personal web address management system 110 may carry out various interactions with the user device 122 and the content management system 130 over network 140 to provide a user 120 with personalized web content when the user 120 accesses a personal web address.

The user device 122 may comprise any number of suitable devices. For example, user device 122 may be a smart phone, a laptop computer, a tablet computer, a personal digital assistant, a smart watch, and/or any other type of device capable of communicating over a network interface (e.g. network 140).

The various entities of exemplary system 100 shown in FIG. 1 may communicate through a network 140. The network 140 may comprise of the Internet or other network interface. It should be appreciated that each of the entities illustrated in exemplary system 100 may engage in other types of digital interactions and activities in addition to, or instead of, those mentioned above, as aspects of the technology described herein are not limited to the analysis of any particular type of digital interactions. Also, digital interactions are not limited to interactions that are conducted via an Internet connection. For example, digital interactions may take place over wired connections and other wireless connections (e.g. Bluetooth, Near Field Communication, radio frequency channels, etc.).

Furthermore, it should be appreciated that any number of suitable devices may be used to implement each of the systems described herein. The system may include any combination of suitable devices to engage in the digital interactions.

According to some embodiments, the content management system 130 may host a web page 132. It may be desirable for a content provider of content management system 130 to provide personalized web content for users visiting the web page 132. For example, a company running the content management system 132 may want to personalize content of the web page 132 for various users during a special ad campaign. The company may want to direct advertising or other communications more personally to a user accessing their content.

According to some embodiments, the personal web address management system 110 may engage in different types of interactions with the content management system 130 in order to provide users with personalized web content on a web page 132. The personal web address management system 110 may include various components to do so including a routing component 112, a personalization component 114, a tracking component 116, and a processor 118 to execute the various components. The system 110 may further include a data set such as database 119 to store data used for various processes.

In some embodiments, the system 110 may receive information specifying a list of target users for a campaign from the content management system 130. In some embodiments, the system 110 may receive a list of target users including values for several attributes associated with the target users. For example, the list may include a list of names of people and attributes associated with the people such as location information (e.g. zip code, state, country), identification information (e.g. gender, age), purchase history information (e.g. last product purchased), job information (e.g. occupation, employer), online account information (e.g. Twitter, LinkedIn, Facebook) and other information about the people. Additionally or alternatively, the system 110 may include one or more APIs through which the system can populate values for the attributes. Furthermore, the system 110 may receive a target web page 132 where target users are to land and receive personalized web content. The personal web address management system 110 may generate separate personal web addresses for each target user. A user 120 may access a personal web address associated with the user to visit web page 132 with personalized web content.

According to some embodiments, the system 110 may execute a personalization component 114 that allows content management system 130 to provide personalized web content to a user visiting web page 132.

In some embodiments, the personalization component 114 may be configured to generate a user interface through which a content provider of content management system 130 may instruct particular variable data to appear on the web page 132 for a target user. The variable data may, for example, correspond to values of attributes associated with target users. In some embodiments, the personalization component 114 may be configured to generate a user interface through which a content provider may provide instructions of variable logic that determines personalized web content. The variable logic may, for example, be configured to determine web content according to values of various attributes of target users. In some embodiments, the personalization component 114 may be configured to generate program code for the content management system 130 to use to dynamically personalize content on the web page 132 for a target user.

In some embodiments, the system 110 may be configured to insert the generated program code into existing program code for web page 132. The personalization component 114 may be configured to insert the program code into the web page 132 within an interface of the content management system. For example, the system 110 may provide a plugin, extension, or other tool (e.g. WordPress plugin or Chrome extension) through which a provider can insert the program code. The program code, when executed by a browser application of a user device 122 accessing a personal web address, may adapt the web page 132 to display personalized web content associated with an identified personal web address.

In some embodiments, the system 110 may be configured to execute a routing component 112. In some embodiments, the system may be configured to receive a request from a user device 122 to access a personal web address that was, for example, previously generated by personal web address management system 110. The routing component 112 may be configured to direct the user device 122 to a landing page associated with the personal web address. In some embodiments, the routing component 112 may be configured to receive requests for variable data associated with a personal web address. The routing component 112 may be configured to then identify stored variable data associated with a personal web address generated for the user 120. For example, the routing component 112 may be configured to identify variable data for personalizing web content that was identified in instructions received by the personalization component 114. In some embodiments, the routing component 112 may be configured to identify the variable data associated with the accessed personal web address in data set 119. The personal web address management system 110 may be configured to transmit the identified variable data to the device. The web page 132, when displayed by client device 122 to the user 120, may then display personalized web content according to the variable data and variable logic implemented by the personalization component 114.

In some embodiments, the system 110 may be configured to execute a tracking component 116 that tracks activity of a user 120 on web page 132 of content management system 130. In some embodiments, the tracking component 116 may be configured to generate program code that the system 110 may use to track activity of the target user. For example, the tracking component 116 may generate an Internet cookie (e.g. Javascript tracking code) by which it can collect user activity data. In some embodiments, the generated program code may generate requests for variable data associated with a target user. The program code may decode received variable data and insert it into the web page. For example, the generated program code may be included or inserted in web page 132. The web page 132 may comprise code, that when executed by a device, causes the device to display the web page. For example, the web page 132 can comprise Javascript code, HTML code, and/or CSS code which, when executed, causes a device to display the web page 132. The program code can be included or inserted into the web page 132 by including or inserting the program code in the code of the web page 132. In some embodiments, the program code can be transmitted to a client device when the client device accessed a personal web address.

In some embodiments, when a user device 122 accesses the web page 132 and executes the program code, the personal web address management system 110 may be configured to receive a request for variable data associated with a target user accessing the personal web address. The system 110 may be configured to provide the variable data in response to the request. In some embodiments, the system 110 may be configured to receive data indicating user activity. In some embodiments, the system 110 may use the received data to determine various indicators of user activity such as a record of visited pages, frequency of visiting a web page, length of time spent on a web page, and other user activity. In some embodiments, the tracking component 116 may be configured to execute actions based on detected actions of the user 120. For example, the tracking component 116 may be configured to send a message to a content provider representative when detecting specific user actions and/or a detected user status. For example, the tracking component 116 may be configured to communicate a message responsive to detecting that the user 120 accessed a URL that was specified by the content provider as a URL that indicates that the user 120 has been converted (e.g., the user performed a purchase). In some embodiments, the tracking component 116 may be configured to provide user activity information to a provider of the content management system 130. For example, the tracking component 116 may be configured to generate a user interface display that displays various usage statistics and graphs to illustrate activity of the user 120 on web page 132.

Figure 2:
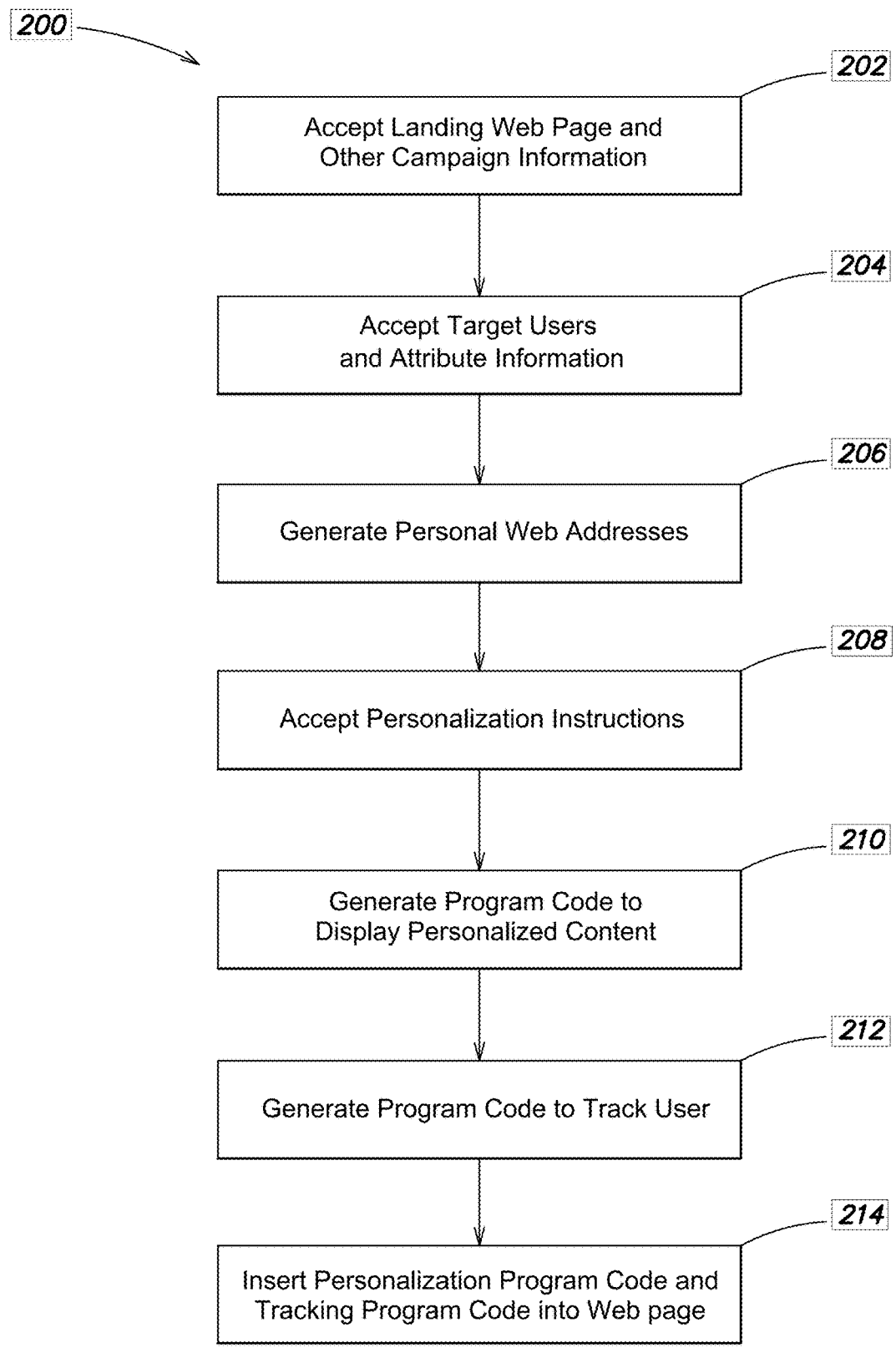
FIG. 2 is a flow diagram illustrating an example process for creating a web page with personalized web content in accordance with some embodiments described herein.

FIG. 2 illustrates an exemplary process 200 for generating personal web addresses, creating a web page with personalized web content, and/or a web page from which user activity can be tracked. Exemplary process 200 may be executed by a suitable system such as system 110 described above with reference to FIG. 1.

Exemplary process 200 begins at act 202 where in the system executing exemplary process 200 accepts a landing web page and other information from a content provider. A landing web page may comprise a target web page that a content provider of a content manage system wants target users to be directed to for a campaign. In one example, the system may be configured to receive a web address (e.g. a URL) for the web page (e.g. web page 132) at which the content provider wants target users to land. In some embodiments, the system may be configured to generate a user interface from which the system may receive the web address of the landing web page.

Next, exemplary process 200 proceeds to act 204, where the system accepts target users and attribute information. In some embodiments, the system may be configured to receive a list of target users comprising, for example, a list of identified users that a content provider wants to target for a campaign. The list of target users may further include attribute information such as values of various variables (e.g., attributes) associated with the target users. For example, attributes may include name, location information, product purchase history information (e.g. last product purchased), online account usernames, e-mail addresses, and other information associated with the user. In some embodiments, the system may be configured generate a user interface to receive the target users and values of associated attributes. In some embodiments, the system may be configured to receive target users and attribute information by executing one or more APIs to receive information from users, other web pages, databases, and/or other sources. The system may be configured store the target users and attribute information. In some embodiments, the system may be configured to generate a unique ID for each target user. The system may be configured to then associate stored data that includes attribute information with the unique ID for the target user.

Next, exemplary process 200 proceeds to act 206 where the system generates a personal web address for each of the target users. In some embodiments, a personal web address may comprise a PURL that is unique to a target user. In some embodiments, the system may be configured to generate random URL strings to generate the personal web addresses. In some embodiments, the system may be configured to generate the URL strings according to a pattern and/or style. For example, the system may be configured to generate a user interface through which the system can receive information specifying URL format pattern and style information. The generated personal web addresses may be associated with the landing page specified by the content provider. For example, the landing web page may be common to all of the target users. Providers of a content management system hosting the specified landing web page may want each personal web address to direct users to the landing web page and want content on the landing web page to be personalized for the target user associated with the personal web address. In some embodiments, the system may generate a unique identifier for each of the target users and/or each of the personal web addresses generated. In some embodiments, a personal web address may be used for multiple target users. For example, the system may generate a unique identifier for each personal web address and/or each target user that is part of a single campaign.

FIG. 4 illustrates an example list 400 that includes target users, associated attributes, and generated personal web addresses for the target users. In some embodiments, the system may be configured to generate and store a target user code for each user. For example, as illustrated in FIG. 4, the system may be configured to generate a target code 402 for the user "John Smith." In some embodiments, the system may be configured to store information about the user. The information can include first name, last name, information about past activity (e.g., last product purchased, last time visiting web page, last visited web page), and location information (e.g., address, country, state, zip, city, GPS coordinates, and other location information). In some embodiments, the system can be configured to store information such as an email, online account username, and other information. Some embodiments are not limited to any particular set of information about users. For example, as shown in FIG. 4, the system may be configured to store a first name 404, last name 406, last product purchased 410, state 412, and zip 414 for each user. In some embodiments, the system may be configured to store a personal web address 408 for each user.

Next, exemplary process 200 proceeds to act 208 where the system accepts personalization instructions. In some embodiments, the system may be configured to generate a user interface through which a content provider can specify instructions to display a value of a variable parameter on the landing web page. The system may, for example, generate an interface using a browser application plugin or extension, or other tool that allows a content provider to specify personalization instructions. In some embodiments, the system may be configured to receive instructions to insert a particular variable and/or to set content according to a particular value of a variable.

Figure 5A:
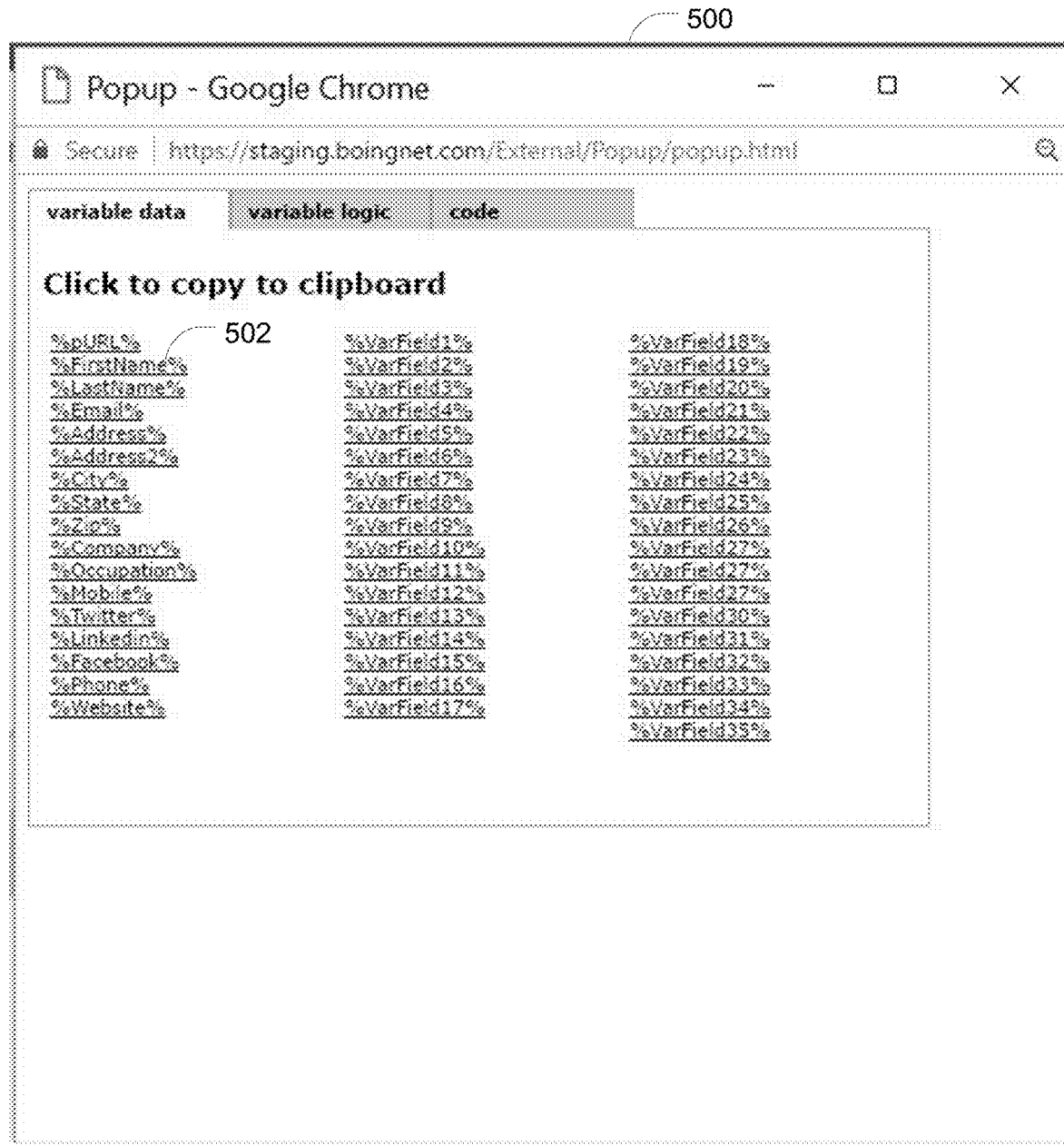
FIG. 5A is an example user interface through which a provider may select variable data to include in a web page in accordance with some embodiments described herein.
Figure 5B:
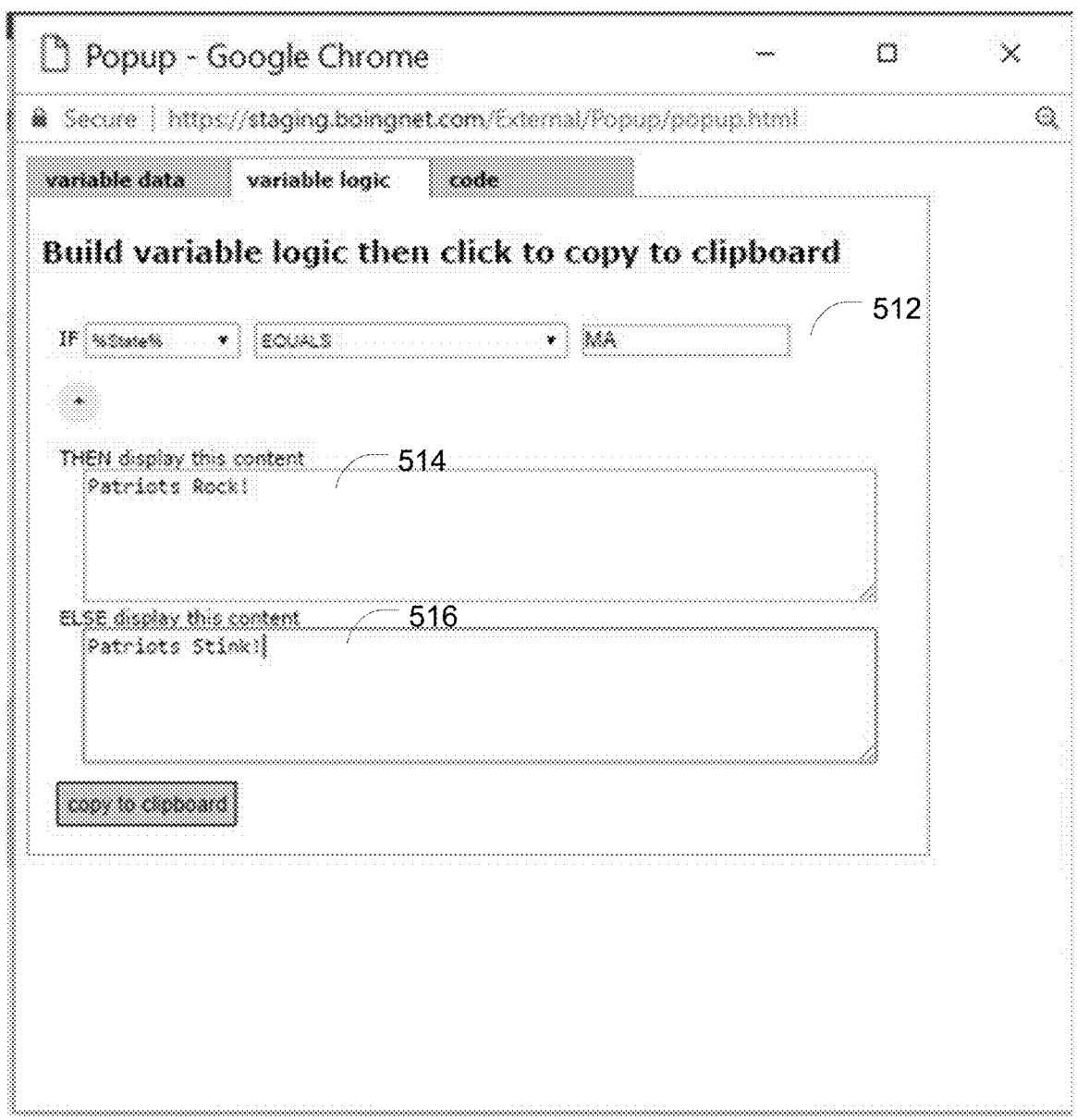
FIG. 5B is an example user interface through which a provider may specify logic for displaying content in a web page in accordance with some embodiments described herein.
Figure 5C:
FIG. 5C is an example user interface through which personalization instructions may be added to a web page in accordance with some embodiments described herein.

One example embodiment of a user interface through which the system may receive instructions is shown in FIGS. 5A-5C. Display screen 500 in FIG. 5A illustrates an example menu through which a content provider may select variable data to be displayed on the landing web page as a function of which personal web address is accessed. In some embodiments, the screen 500 may be configured to provide a plurality of variables 502 that can be selected for displaying on a personalized web page and/or used to determine content on the personalized web page. For example, the system may receive a selection of a first name variable. In some embodiments, in response to receiving a selection of a variable, the system may be configured to copy the variable and store it. For example, the system may be configured to copy the variable to a clipboard. FIG. 5C illustrates how the variable can be pasted into a portion of the web page. A user interface screen 520 of the personalization tool, may allow a user to place the variable in the web page using the web page editor.

FIG. 5B illustrates a user interface screen 510 through which a user may specify variable logic instructions to determine web page content. For example, the user may specify instructions to display a set of content if a value of one of the target user's attributes matches a criteria and display a different set of content if the value does not meet the criteria. In the example shown, the user has specified instructions to display "Patriots Rock!" (514) if the state variable of the target user is Massachusetts (512) and display "Patriots Stink!" (516) otherwise. In another example, a user may specify image content according to specified logic.

FIG. 5C illustrates an example user interface screen 520 via which the system can allow a user to personalize web content on a landing page based on personalization instructions received from the user. In screen 520 shown in FIG. 5C, in instruction snippet 524 (e.g., code snippet), the user has specified a string and image to display if the state attribute (e.g., variable) of the target user associated with the accessed personal web address is 'MA' and has specified a different string without an image in the case that the state attribute is not 'MA'. In the example shown, if the state variable associated with the user is not 'MA', the software logic specifies displaying "Have a nice day." The personalized web page also displays the first name of the user for whom the web page is personalized as indicated by the variable "% FirstName %" shown in screen 520. In some embodiments, as illustrated in screen 520, the user interface screen allows a user to specify a placement of personalized content in the web page. For example, the user has indicated in screen 520 that the personalized content is to be placed at the top of the web page by placing the personalization instructions at the top of an area in the user interface screen 520 representing the web page. In some embodiments, the user interface screen can provide options for placement of personalized content at specific locations (e.g., coordinates) in the web page.

Next, exemplary process 200 proceeds to step 210 where the system generates program code (e.g., personalization code) that, when executed by a client device accessing the web page, will cause the client device to display the personalized content according to the personalization instructions. In some embodiments, the program code can be configured to generate web content personalized for a user. In some embodiments, the system may be configured to generate program code that may be inserted into an existing web page. The program code, when executed by a browser application of a device, uses values of variables associated with an identified personal web address from which the web page was accessed to generate personalized web content. In some embodiments, the code, when executed by the client device, may cause the client device to display the web page with web content personalized for the user. The system may be configured to create an adaptable version of the web page that can change based on a personal web address to provide personalized web content to a user accessing the web page through the personal web address. In some embodiments, the program code may comprise HTML and/or CSS code than can be inserted into existing web page code. For example, the web page code can include existing HTML and/or CSS code that, when executed by a client device, causes the client device to display the web page. The system may be configured to insert the personalization code into the existing web page code. In some embodiments, the code may comprise Javascript code, PHP code, Java code, Perl code, Python code, Django code, C++ code, C# code, and/or other type of code. Some embodiments are not limited to a particular type of software code.

In some embodiments, the personalization code may be configured to identify a target user and request variable data from the system. For example, the code may be configured to generate a request for variable data associated with a particular target user. The client device, by executing the code, may request values of one or more attributes. In some embodiments, the code may be configured to include a unique identifier (e.g., a target user code) associated with the target user in the request in order to receive attribute values for the target user. In some embodiments, the code may be configured to decode received data objects or files containing the variable data and insert the variable data or values from the variable data into web page code in place of variable inputs according to the personalization instructions. For example, the personalization code may include code (e.g., HTML and/or CSS code) with strings representing variables. The personalization code, when executed by the client device, may insert values of the variables received from the system in place of the strings.

Figure 8:
FIG. 8 is an example of generated tracking code in accordance with some embodiments.

Next, exemplary process 200 proceeds to step 212 where the system executing process 200 generates tracking code. The tracking code (e.g., program code) may be configured to track user activity on the web page. For example, the tracking code may comprise an Internet cookie that collects data about user activity on a web page. In some embodiments, the system may be configured to receive data indicating user activity on the web page when a browser executes the program code. Screen 800 of FIG. 8 illustrates an example set of tracking code that may be inserted into a web page for use by the system to track user activity. In some embodiments, the program code may be inserted into the existing web page. For example, the program code may comprise Javascript code that can be inserted into Javascript code of the existing web page. In some embodiments, the code may comprise Javascript code, HTML code, CSS code, PHP code, Java code, Perl code, Python code, Django code, C++ code, C# code, and/or other type of code. Some embodiments are not limited to a particular type of software code.

In some embodiments, the tracking code may be configured to collect data indicating user activity. For example, the tracking code can be configured to collect data indicating navigation of the user to different web pages and/or web sites from the personalized web page. In another example, the tracking code can be configured to collect data indicating actions performed by the user such as viewing of items, purchasing an item, performing a search, saving an item, adding an item to a container (e.g., a cart), or other actions performed by the user. In some embodiments, the tracking code can be configured to collect data in real time responsive to user actions. For example, in response to the user performing an action, the tracking code may collect data indicating the action. The data can include one or more records detailing one or more actions performed by the user. In some embodiments, a record can include a time of the action, a description of the action, and other information about the action. In some embodiments, the tracking code can comprise a cookie that is transmitted and stored on a client device. The cookie can be configured to track activities of the user on the web page.

In some embodiments, the tracking code and/or the personalization code, when executed by a client device, can be configured to cause the client device to request variable data from the system. For example, a client device requests web page files including the tracking code and/or the personalization code. The client device may then execute the tracking code and/or the personalization code. The tracking code and/or the personalization code, when executed, may cause the client device to request data from the system. In some embodiments, the client device may request variable data from the system for use in generating personalized web content on the landing web page. For example, the client device may request values of one or more attributes which the personalization code is configured to use to generate the personalized web content on the landing web page.

In some embodiments, the tracking code and the personalization code may comprise a single set of program code. In some embodiments, the tracking code and the personalization code may be separate sets of program code. In some embodiments, the personalization code may comprise the tracking code. In some embodiments, the tracking code may comprise the personalization code.

Next, exemplary process 200 proceeds to act 214 where the system inserts the generated personalization program code and/or the tracking program code into the landing web page. In some embodiments, the system may be configured to insert the program code and/or the tracking program code into the landing web page within an interface of a content management system. For example, a user accessing the personalization interfaces generated by the system may insert the variable logic directly through the content management interface as illustrated in example screen 520 of FIG. 5C. In some embodiments, by inserting the personalization program code in the landing web page, the system creates an adaptable web page that, when rendered by a browser application to a target user accessing a personal web address, displays personalized web content to the target user. In some embodiments, by inserting the tracking program code, the system may be configured to track activity of the user and to associate an identity of the user with the activity.

Figure 6B:
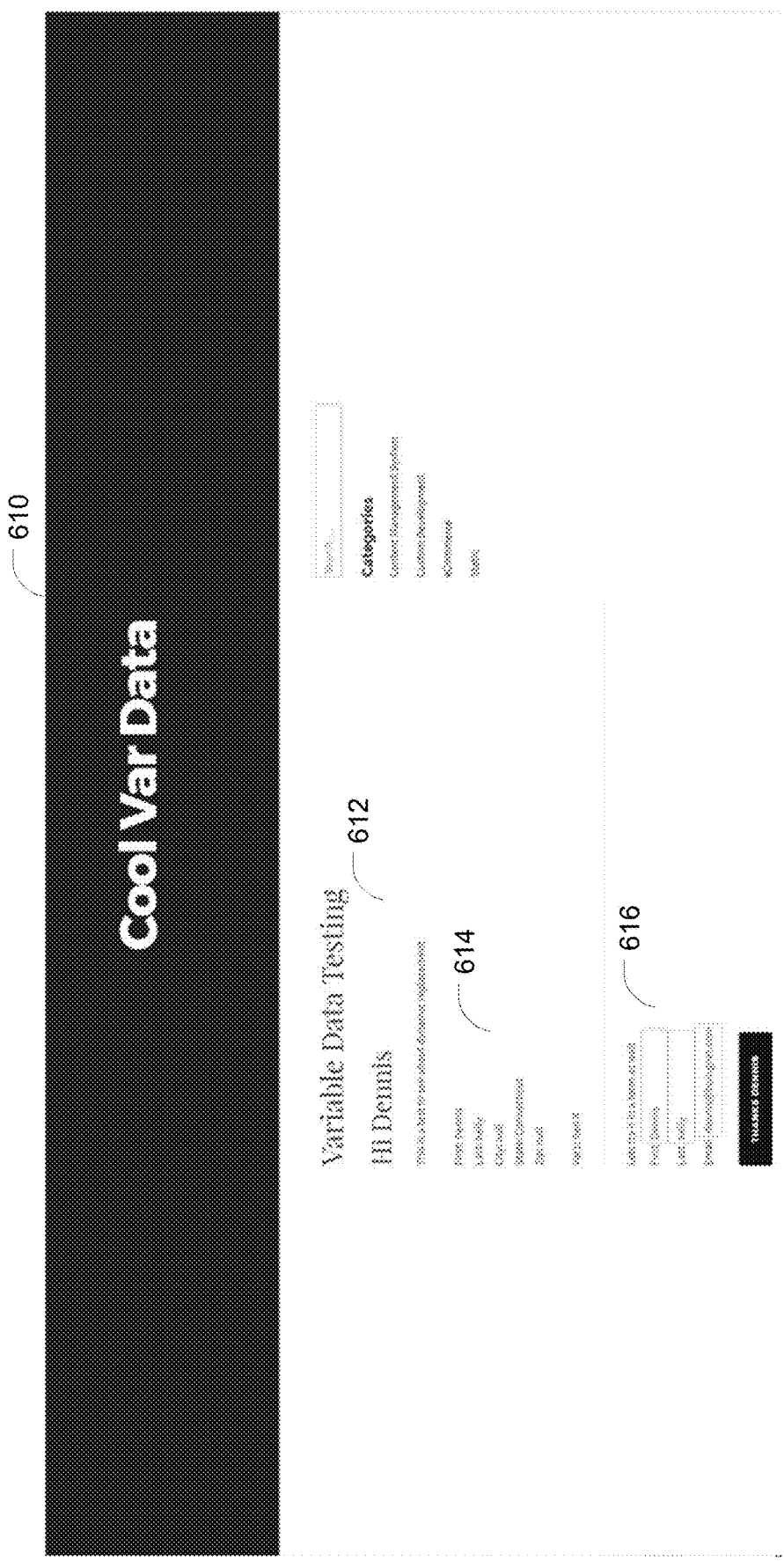
FIG. 6B illustrates an example web page displayed by executing the example code of FIG. 6A.

Example code 600 in FIG. 6A displays an example embodiment of a web page with inserted program code that implements personalization instructions to display a personalized web page using variable data. The program code implements instructions to display a first name, last name, city, state, and zip of the target user as indicated by reference 604. It also includes code that implements instructions to include first name, last name, and an email id of the target user as indicated by reference 606. An example display of the code, when executed by a browser application, is shown in screen 610 of FIG. 6B. The web page has adapted to include attribute values associated with the personal web address from which a target user accessed the page. The attribute values of the associated target user are displayed (612, 614, 616).

Figure 7B:
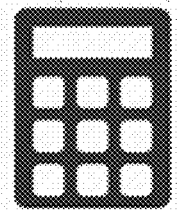
FIG. 7B illustrates an example web page displayed by executing the example code of FIG. 7A.

Example code 700 in FIG. 7A illustrates an example embodiment of a web page with inserted program code that displays web content according to received personalization instructions using variable data. The code implements logic to display a particular string 704 when a particular condition 702 is met. Screen 710 shown in FIG. 7B illustrates an example web page rendered as a result of executing the code. Notice at portion 712 of the web page, the web page displays a particular value according to an identified value of an attribute of the target user linked to the personal web address from which the page was accessed.

FIG. 3A illustrates an example process flow 300 by which various entities may interact in order to deliver personalized web content to a user (e.g. user 120) accessing a personal web address through a client device (e.g. device 122). In some embodiments, the user may access the personal web address from a communication received by the user. For example, the personal web address may be included in an email that was received by the user and viewed on the client device. In another example, the personal web address may be have been a physical communication. In this example, the user may access the personal web address displayed on the physical communication. The physical communication can comprise a letter, post card, billboard, flyer, advertisement, and/or another form of physical communication. Some embodiments are not limited to where the user found and/or accessed the personal web address.

Exemplary process flow 300 begins at act 302 where a client device 122 requests to access a personal web address. The personal web address may have been generated for a target user and associated with a web page by personal web address management system 110 (e.g. through process 200). The personal web address, when accessed, may direct the device 122 to to web page hosted by content management system 130. In some embodiments, the personal web address management system 110 may receive the request to access the personal web address. The system 110 may then identify the associated web page hosted on content management system 130 and direct the client device 122 to the web page.

Next, exemplary process flow 300 proceeds to act 304 where the content management system 130, upon receiving a request to access the web page, provides web page files to the client device 122. The content management system 130 may host the web page and store a plurality of web page files for displaying the web page. The web page files may include personalization and/or tracking code. For example, the personalization and/or tracking code may have been inserted by system 110 (e.g. during process 200).

Next, exemplary process flow 300 proceeds to act 306 where the client device 122 executes the web page program code. The executed web page program code may include personalization and/or tracking code generated and inserted into the web page by system 110 (e.g. during process 200). In some embodiments, the client device 122 may execute the personalization and/or tracking code upon receiving the web page files.

Next, exemplary process flow 300 proceeds to act 308 where the client device 122 requests variable data from the personal web address management system 110. In some embodiments, the web page program code, when executed by a browser application on client device 122, causes the client device 122 to request variable data from the personal web address management system 110. For example, the personalization and/or the tracking code included in the web page program code, when executed by the client device 122, may cause the client device 122 to request the variable data from the personal web address management system 110. The variable data may include values of one or more attributes associated with the target user (e.g. name, location, social media accounts, last product purchased, etc.). The personal web address management system 110 may have stored the variable data with the associated personal web address and/or unique identifier of the target user (e.g. during process 200).

In some embodiments, the program code, when executed, may use a unique identifier (e.g., a user code) of a target user associated with the accessed personal web address in the request to request the variable data. The system 110 may have generated the unique identifier (e.g. during process 200). The program code may, for example, cause the client device 122 to provide the unique identifier to the personal web address management system 110. The personal web address management system 110 may be configured to identify the variable data based on the unique identifier.

Next, exemplary process flow 300 proceeds to act 310 where the personal web address management system 110 receives the request for variable data and, in response, identifies variable data. In some embodiments, the system 110 may be configured to look up variable data associated with the target user associated with the accessed personal web address. In some embodiments, the system 110 may be configured to receive the unique identifier of the target user associated with the personal web address. The system 110 may be configured to utilize the unique identifier to identify variable data associated with the personal web address and target user. For example, the system 110 may be configured to look up the unique identifier in a database (e.g. database 119) to identify and retrieve the variable data. The system 110 may be configured to retrieve values required to implement personalization instructions specified by a content provider (e.g. during process 200). In some embodiments, the personal web address management system 110 may be configured to identify the variable data based on the personal web address from which the web page was accessed. For example, the system 110 may be configured to look up the personal data based on a string of the personal web address from which the web address was cancelled. Some embodiments are not limited to how the system 110 identifies the variable data.

Next, exemplary process flow 300 proceeds to act 312 where the personal web address management system 110 transmits the retrieved variable data to the client device 122. In some embodiments, the system 110 may be configured to transmit a file or other object containing the variable data which may include values of attributes associated with the target user of the accessed personal web address. In some embodiments, the system 110 may be configured to package the variable data as a JSON file or object and transmit it to the client device 122. In some embodiments, the system 110 may be configured to transmit the data as a text file, an excel file, an XML file, an HTML file, and/or as another format. In some embodiments, the system 110 may be configured to use any suitable method of transferring data to transmit the variable data to the user device 122.

Next, exemplary process flow 300 proceeds to act 314 where the client device 122 receives the variable data and inserts it into the web page files. In some embodiments, the web page may include program code that, when executed by a browser application on the client device 122, decodes received variable data and uses it to replace variable inputs in the web page program code. For example, the program code, when executed, may decode a received data object (e.g., a JSON object) or other object containing the variable data, and insert values from the decoded object into variable inputs of the web page files. The program code may comprise program code that was inserted into the web page by personal web address management system 110 (e.g. during process 200).

Next, exemplary process flow 300 proceeds to act 316 where the client device 122 displays the web page with personalized web content. The web page may be a landing web page specified by a content provider through process 200 for example. In some embodiments, a browser application of the device 122 may execute program code of the web page to render the web page using the included variable data by executing personalization code (e.g. code inserted during process 200) to display the web page with personalized web content. The web page may be adapted to the target user as a result of incorporating the variable data identified and transmitted by the personal web address management system 110 and executing the personalization code. In some embodiments, the device 122 may display values of attributes associated with the user. In some embodiments, the device 122 may display specific content based on values of attributes associated with the user. The personalized content may, for example, be displayed according to personalization instructions that were received by personal web address management system 110 during process 200.

In some embodiments, at act 316, the personal web address management system 110 may be configured to receive data indicating activity of the user after the user accesses the web page via the personal web address. In some embodiments, tracking program code on the client device, when executed by the client device, may be configured to track activity of the user. In some embodiments, the tracking code may have been included in the web page code retrieved from the content management system 130. In some embodiments, the tracking program code can comprise a cookie that is transmitted to the client device 122. The cookie can be configured to track the activity of the user. For example, the cookie can be configured to collect data indicating activity of the user, and transmit the data to the personal web address management system 110 and/or the content management system 130.

In some embodiments, the personal web address management system 110 may be configured to associate data received about user activity with an identity of the user. The personal web address management system 110 may have a user identity associated with the personal web address via which the client device accessed the web page. The personal web address management system 110 may be configured to associate activity of the user (e.g., data indicating activity) with a user identity associated with the personal web address. For example, the personal web address management system 110 may be configured to store an association of the data indicating the user's activity with a name, address, location, and/or other attribute of the user associated with the personal web address. In another example, the personal web address management system 110 may be configured to store an association of the data indicating the user's activity with a particular campaign, web site, content management system, or other entity associated with the personal web address.

Figure 3B:
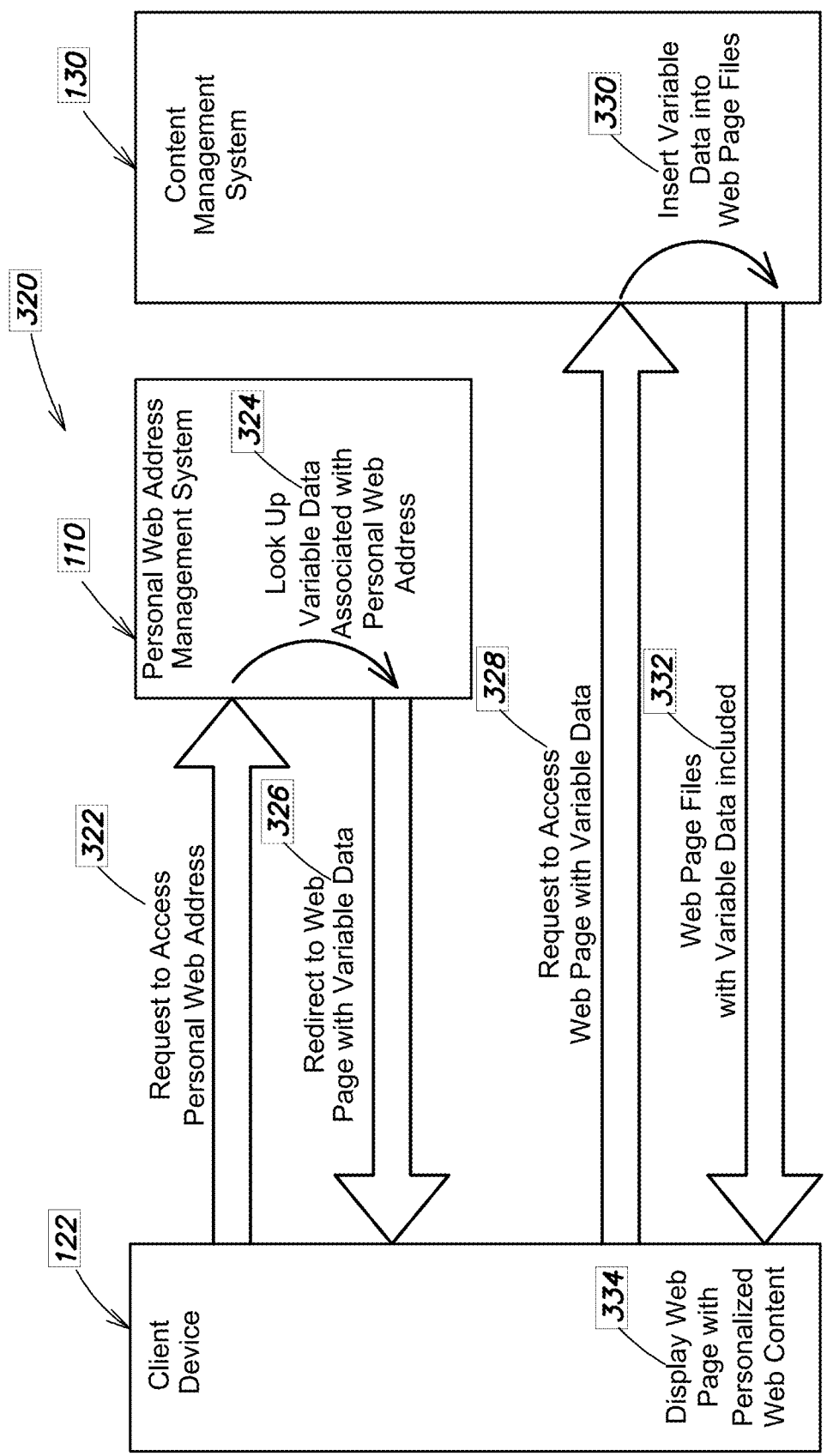

FIG. 3B illustrates another example process flow 320 by which various entities may interact in order to deliver personalized web content to a user (e.g. user 120) accessing a personal web address through a client device (e.g. device 122).

Exemplary process flow 320 begins at act 322 where the personal web address management system 110 receives a request from a client device 122 to access a personal web address. The system 110 may have previously generated a plurality of personal web addresses associated with a plurality of target users (e.g. through exemplary process 200). The personal web address to which access was requested may be associated with a specific target user (e.g. user 120) using the device 122 from which the request originated.

Next, exemplary process flow 320 proceeds to act 324 where the system 110 identifies the personal web address and looks up variable data associated with the personal web address. The variable data may comprise values of one or more attributes associated with the target user (e.g. name, location, social media accounts, last product purchased, etc.). In some embodiments, the system 110 may be configured to retrieve the data from a database (e.g. database 119). The system 110 may, for example, previously have stored attribute values associated with the target users (e.g. during process 200). The system 110 may retrieve values required to implement personalization instructions specified by a content provider (e.g. during process 200).

Next, exemplary process flow 320 proceeds to act 326 where the system 110 redirects the device 122 to a web page with the retrieved variable data. In some embodiments, the system 110 may communicate an instruction to redirect the device 122 to a landing web page. The landing page may, for example, have been specified by a content provider during process 200 described above with respect to FIG. 2. In some embodiments, the system 110 may redirect the client device to the landing web page with values by generating a URL containing the landing page URL along with values of variable data. The device 122 may then access this URL. Next, exemplary process flow 320 proceeds to act 328 where the client device 122 is redirected and requests access to the landing web page along with the variable data. The client device 122 may, for example, request access to a URL received from the system 110 containing the landing web page URL along with the variable data values.

Next, exemplary process flow 320 proceeds to act 330 where a content management system 130 that hosts the landing web page receives the variable data and request to access the lading page from the client device 122. The content management system 130 may, for example, access values from the URL that the client device 122 followed. The content management system 130 may then insert the variable data into the web page files. In some embodiments, the content management system 130 may insert received values into variable inputs of the web page program code. In another embodiment, the content management system 130 may generate a web page with variables replaced with received values in the variable data.

Next, exemplary process flow 320 proceeds to act 332 where the content management system 130 transmits the web page files with the variable data included to the client device 122. In some embodiments, the content management system 130 may transmit web page files with variables replaced with values to the device 122. In another embodiment, the content management system 130 may transmit web page files along with variable data that will be incorporated by a browser application of the device 122.

Next, exemplary process flow 320 proceeds to act 334 where the client device 122 displays the web page with personalized web content. The web page may be a landing web page specified by a content provider through process 200 for example. A browser application of the device 122 may, for example, render the web page using the received web page files with included variable data to generate the web page displaying personalized web content. The web page may be adapted to the target user as a result of incorporating the variable data identified and transmitted by the personal web address management system 110. In some embodiments, the device 122 may display values of attributes associated with the user. In another embodiment, the device 122 may display specific content based on values of attributes associated with the user. The personalized content may, for example, be displayed according to personalization instructions that were received by personal web address management system 110 during process 200.

In some embodiments, at act 334, the personal web address management system 110 may be configured to receive data indicating activity of the user after the user accesses the web page via the personal web address. In some embodiments, tracking program code on the client device, when executed by the client device, may be configured to track activity of the user. In some embodiments, the tracking code may have been included in the web page code retrieved from the content management system 130. In some embodiments, the tracking program code can comprise a cookie that is transmitted to the client device 122. The cookie can be configured to track the activity of the user. For example, the cookie can be configured to collect data indicating activity of the user, and transmit the data to the personal web address management system 110 and/or the content management system 130.

In some embodiments, the personal web address management system 110 may be configured to associate data received about user activity with an identity of the user. The personal web address management system 110 may have a user identity associated with the personal web address via which the client device accessed the web page. The personal web address management system 110 may be configured to associate activity of the user (e.g., data indicating activity) with a user identity associated with the personal web address. For example, the personal web address management system 110 may be configured to store an association of the data indicating the user's activity with a name, address, location, and/or other attribute of the user associated with the personal web address. In another example, the personal web address management system 110 may be configured to store an association of the data indicating the user's activity with a particular campaign, web site, content management system, or other entity associated with the personal web address.

Figure 9A:
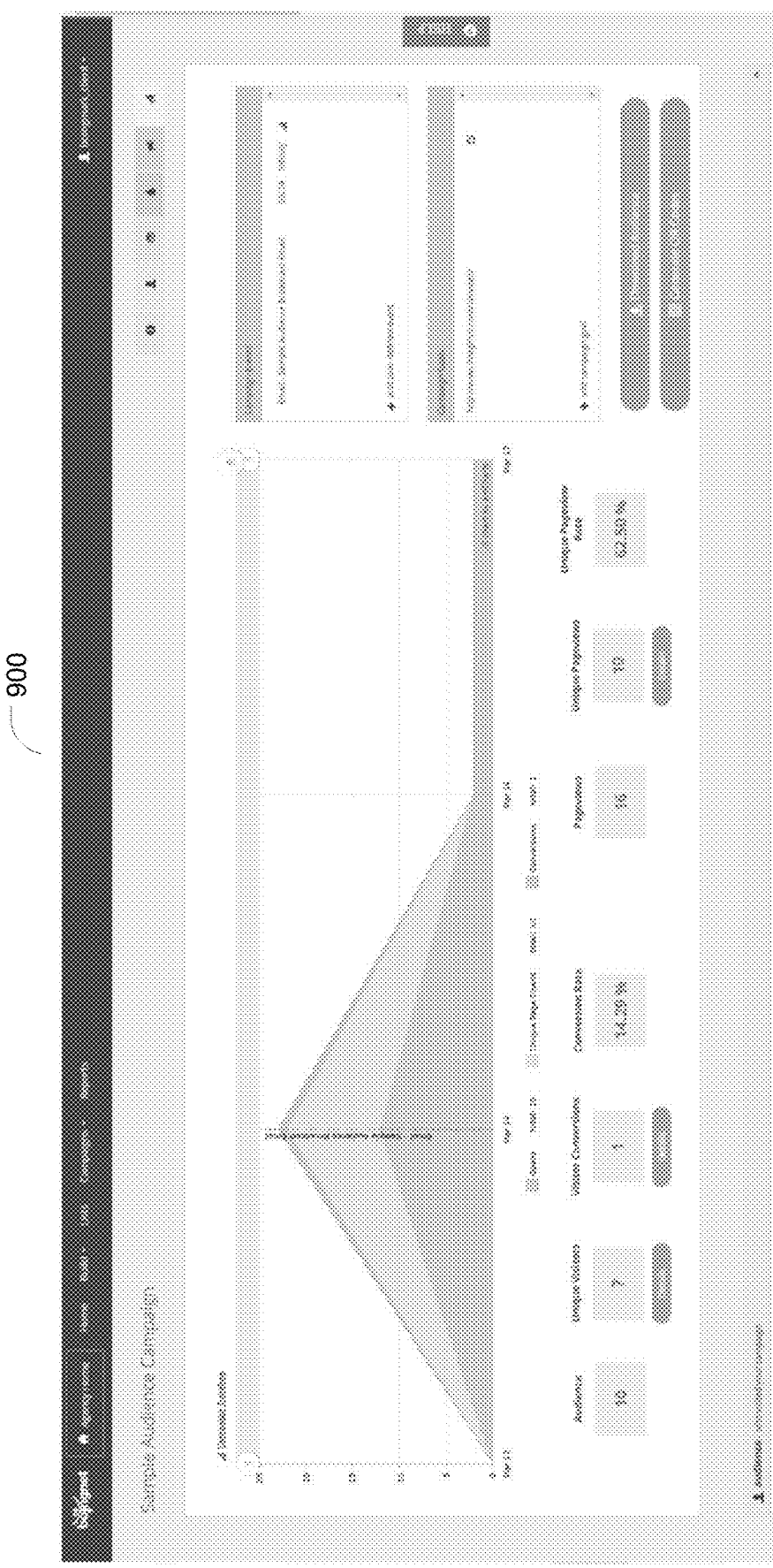
FIG. 9A illustrates an example user interface display for showing tracking information in accordance with embodiments described herein.
Figure 9B:
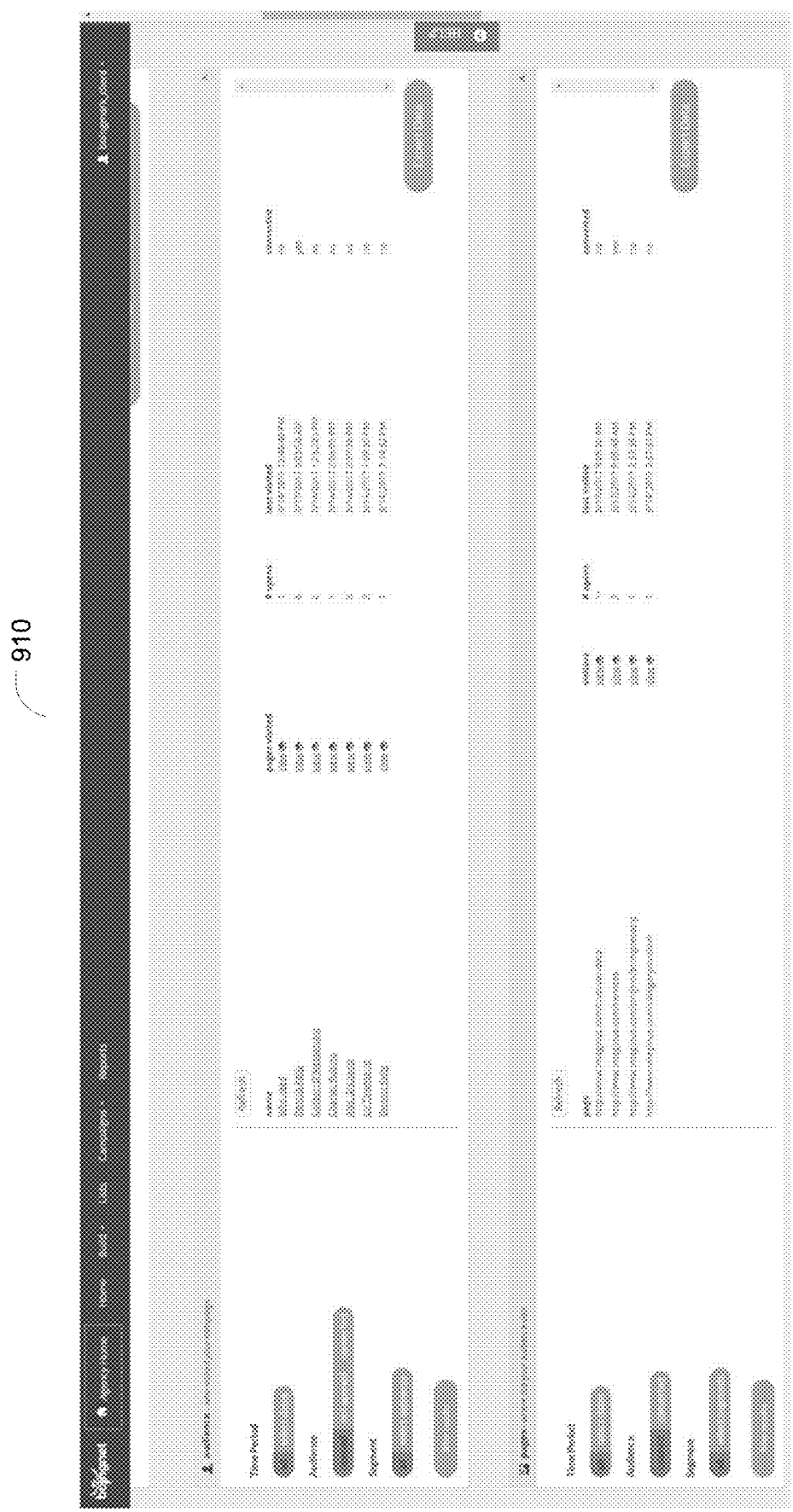
FIG. 9B illustrates an example user interface display for showing tracking information in accordance with embodiments described herein.

In some embodiments, the web page files may include added tracking program code inserted into the web page files during, for example, process 200. The system 110 may be configured to receive data indicating user activity on the web page. In some embodiments, the system 110 may store the received data in a database 119. In some embodiments, the system 110 may be configured to generate user display screens to provide usage information to a provider of content management system 130. The system may, for example, generate graphs, calculate parameter values, and display other information. One example user interface display is shown in FIGS. 9A and 9B. Screens 900 and 910 illustrate examples of tracking information display screens generated by system 110.

In some embodiments, the system 110 may associate data collected by execution of the tracking code to a specific target user. The system 110 may, for example, collect data indicating user activity and link it with a unique ID of the target user associated with a personal web address from which the web page was targeted. The system 110 may display this user specific data to content providers (e.g. as shown in FIGS. 9A and 9B).

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 10:
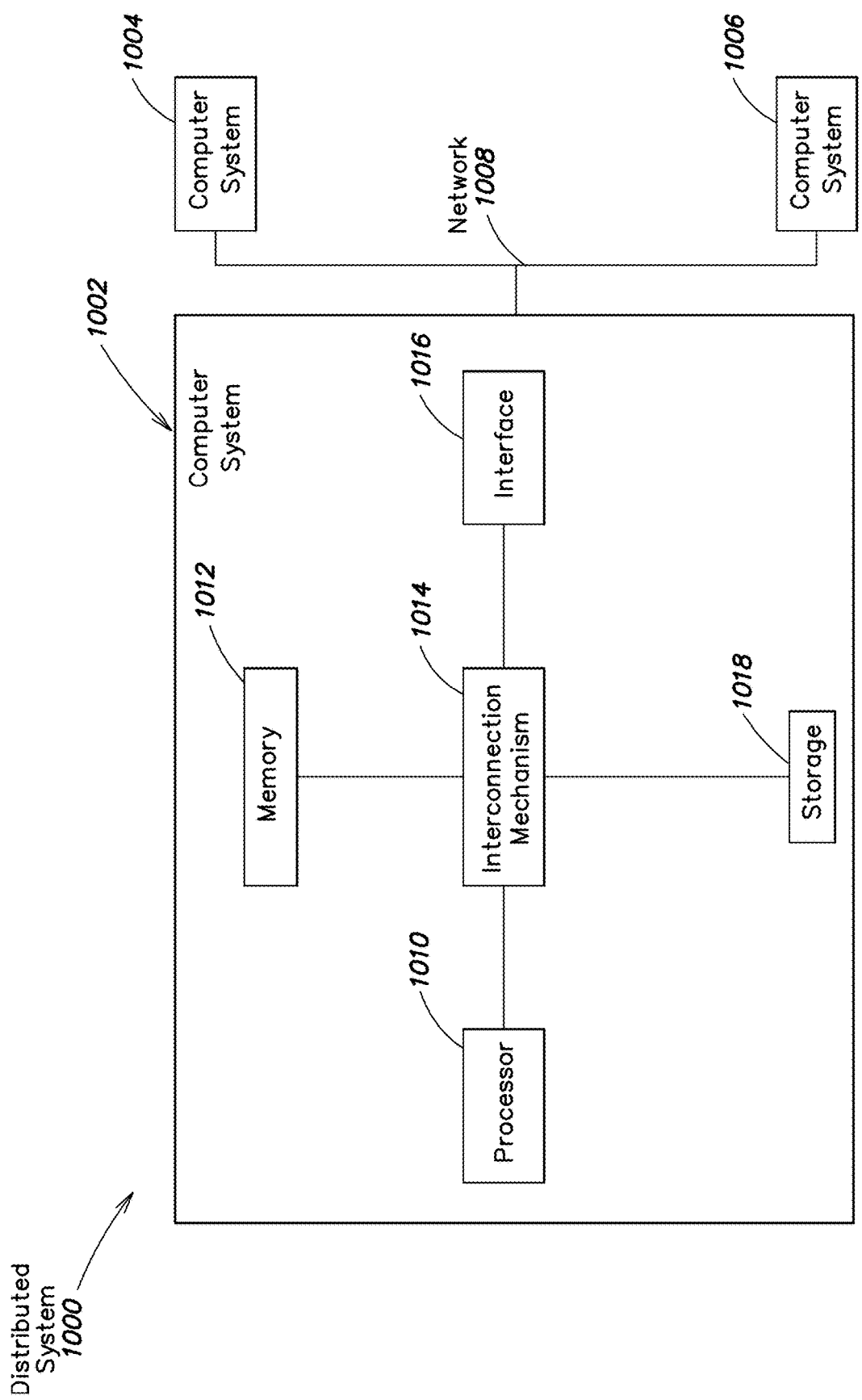
FIG. 10 is a schematic diagram of an exemplary computer system that may be specially configured to perform processes and functions disclosed herein.

For example, various aspects, functions, and processes may be distributed among one or more computer systems configured to provide a service to one or more client computers, or to perform an overall task as part of a distributed system, such as the distributed computer system 1000 shown in FIG. 10. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 10, there is illustrated a block diagram of a distributed computer system 1000, in which various aspects and functions are practiced. As shown, the distributed computer system 1000 includes one or more computer systems that exchange information. More specifically, the distributed computer system 1000 includes computer systems 1002, 1004, and 1006. As shown, the computer systems 1002, 1004, and 1006 are interconnected by, and may exchange data through, a communication network 1008. The network 1008 may include any communication network through which computer systems may exchange data. To exchange data using the network 1008, the computer systems 1002, 1004, and 1006 and the network 1008 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 1002, 1004, and 1006 may transmit data via the network 1008 using a variety of security measures including, for example, SSL or VPN technologies. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes a processor 1010, a memory 1012, an interconnection element 1014, an interface 1016 and data storage element 1018. To implement at least some of the aspects, functions, and processes disclosed herein, the processor 1010 performs a series of instructions that result in manipulated data. The processor 1010 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1010 is connected to other system components, including one or more memory devices 1012, by the interconnection element 1014.

The memory 1012 stores programs (e.g., sequences of instructions coded to be executable by the processor 1010) and data during operation of the computer system 1002. Thus, the memory 1012 may be a relatively high performance, volatile, random access memory such as a dynamic random access memory ("DRAM") or static memory ("SRAM"). However, the memory 1012 may include any device for storing data, such as a disk drive or other nonvolatile storage device. Various examples may organize the memory 1012 into particularized and, in some cases, unique structures to perform the functions disclosed herein. These data structures may be sized and organized to store values for particular data and types of data.

Components of the computer system 1002 are coupled by an interconnection element such as the interconnection element 1014. The interconnection element 1014 may include any communication coupling between system components such as one or more physical busses in conformance with specialized or standard computing bus technologies such as IDE, SCSI, PCI and InfiniBand. The interconnection element 1014 enables communications, including instructions and data, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1002 to exchange information and to communicate with external entities, such as users and other systems.

The data storage element 1018 includes a computer readable and writeable nonvolatile, or non-transitory, data storage medium in which instructions are stored that define a program or other object that is executed by the processor 1010. The data storage element 1018 also may include information that is recorded, on or in, the medium, and that is processed by the processor 1010 during execution of the program. More specifically, the information may be stored in one or more data structures specifically configured to conserve storage space or increase data exchange performance. The instructions may be persistently stored as encoded signals, and the instructions may cause the processor 1010 to perform any of the functions described herein. The medium may, for example, be optical disk, magnetic disk or flash memory, among others. In operation, the processor 1010 or some other controller causes data to be read from the nonvolatile recording medium into another memory, such as the memory 1012, that allows for faster access to the information by the processor 1010 than does the storage medium included in the data storage element 1018. The memory may be located in the data storage element 1018 or in the memory 1012, however, the processor 1010 manipulates the data within the memory, and then copies the data to the storage medium associated with the data storage element 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having a different architectures or components than that shown in FIG. 10. For instance, the computer system 1002 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 1010 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least some embodiments of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
   at least one processor configured to:
   store variable data associated with a personal web address, wherein:
   the personal web address is associated with a target user, and the personal web address leads to a web page provided by a content management system that is located remotely from the system; and the variable data comprises at least one value of at least one attribute associated with the target user;
receive instructions configured to generate web content personalized for a plurality of different target users, wherein the instructions comprise variable logic configured to select among a plurality of different personalized content insertions based on the at least one value of the at least one attribute;
receive, from a client device accessing the web page via the personal web address, a request for at least a portion of the variable data associated with the personal web address, the portion of the variable data including the at least one value of the at least one attribute;
identify, responsive to receiving the request, the stored variable data associated with the personal web address;
generate, based on the instructions, a first set of program code that, when executed by the client device, causes the client device to generate the web content personalized for the target user using the stored variable data, comprising executing the variable logic to select a personalized content insertion for the web page for the target user from the plurality of different personalized content insertions based on the at least one value of the at least one attribute associated with the target user;
transmit the requested portion of the variable data to the client device and the first set of program code, wherein the web page, when displayed by the client device, includes the web content personalized for the target user, the web content personalized based on the transmitted portion of the variable data and comprising the selected personalized content insertion;
receive data indicating activity of the target user comprising a record of at least one visited web page that initiated from the web page and one or more of a frequency of visiting at least one visited web page, a length of time spent on the at least one visited web page, or both;
determine the at least one visited web page comprises a conversion URL that, when accessed by the client device from the web page, indicates that the target user has been converted by the web page by making a purchase of an item through accessing the conversion URL; and
transmit, based on determining the at least one visited web page comprises the conversion URL, a message to a content provider of the web content personalized for the target user comprising data indicative of the target user making the purchase using the conversion URL.

2. The system of claim 1, wherein the at least one processor is further configured to insert the first set of program code into a set of web page code that, when executed by the client device, causes the client device to display the web page.

3. The system of claim 1, wherein the at least one processor is further configured to receive data indicating activity of the target user.

4. The system of claim 3, wherein the at least one processor is further configured to:
generate a second set of program code that, when executed by the client device, collects the data indicating activity of the target user.

5. The system of claim 3, wherein the at least one processor is further configured to store an association of the data indicating activity of the target user with an identity of the target user based on the personal web address.

6. The system of claim 1, wherein the at least one processor is further configured to store variable data associated with a plurality of respective personal web address for each of a plurality of target users, wherein the respective personal web address leads to the web page, wherein the web page, when displayed by the client device, includes web content personalized for a corresponding one of the plurality of target users based on the stored variable data.

7. A computer-implemented method comprising acts of:
storing variable data associated with a personal web address, wherein:
the personal web address is associated with a target user, and the personal web address leads to a web page provided by a content management system that is located remotely from the system; and
the variable data comprises at least one value of at least one attribute associated with the target user;
receiving instructions configured to generate web content personalized for a plurality of different target users, wherein the instructions comprise variable logic configured to select among a plurality of different personalized content insertions based on the at least one value of the at least one attribute;
receiving, from a client device accessing the web page via the personal web address, a request for at least a portion of the variable data associated with the personal web address, the portion of the variable data including the at least one value of the at least one attribute;
identifying, responsive to receiving the request, the stored variable data associated with the personal web address;
generating, based on the instructions, a first set of program code that, when executed by the client device, causes the client device to generate the web content personalized for the target user using the stored variable data, comprising executing the variable logic to select a personalized content insertion for the web page for the target user from the plurality of different personalized content insertions based on the at least one value of the at least one attribute associated with the target user;
transmitting the requested portion of the variable data to the client device and the first set of program code, wherein the web page, when displayed by the client device, includes web content personalized for the target user, the web content personalized for the target user based on the transmitted portion of the variable data and comprising the selected personalized content insertion;
receiving data indicating activity of the target user comprising a record of at least one visited web page that initiated from the web page and one or more of a frequency of visiting at least one visited web page, a length of time spent on the at least one visited web page, or both;
determining the at least one visited web page comprises a conversion URL that, when accessed by the client device from the web page, indicates that the target user has been converted by the web page to access the conversion URL and make a purchase of an item; and
transmitting, based on determining the at least one visited web page comprises the conversion URL, a message to a content provider of the web content personalized for the target user comprising data indicative of the target user making the purchase using the conversion URL.

8. The method of claim 7, further comprising inserting the first set of program code into a set of web page code that, when executed by the client device, causes the client device to display the web page.

9. The method of claim 7, further comprising receiving data indicating activity of the target user.

10. The method of claim 9, further comprising generating a second set of program code that, when executed by the client device, collects the data indicating the activity of the target user.

11. The method of claim 9, further comprising storing an association of the data indicating activity of the target user with an identify of the target user based on the personal web address.

12. At least one non-transitory computer readable medium storing processor-executable instructions, the instructions when executed by the at least one processor cause the at least one processor to perform a method comprising:
   storing variable data associated with a personal web address, wherein:
      the personal web address is associated with a target user, and the personal web address leads to a web page provided by a content management system that is located remotely from the system; and
      the variable data comprises at least one value of at least one attribute associated with the target user;
   receiving instructions configured to generate web content personalized for a plurality of different target users, wherein the instructions comprise variable logic configured to select among a plurality of different personalized content insertions based on the at least one value of the at least one attribute;
   receiving, from a client device accessing the web page via the personal web address, a request for at least a portion of the variable data associated with the personal web address, the portion of the variable data including the at least one value of the at least one attribute;
   identifying, responsive to receiving the request, the stored variable data associated with the personal web address;
   generating, based on the instructions, a first set of program code that, when executed by the client device, causes the client device to generate the web content personalized for the target user using the stored variable data, comprising executing the variable logic to select a personalized content insertion for the web page for the target user from the plurality of different personalized content insertions based on the at least one value of the at least one attribute associated with the target user;
   transmitting the requested portion of the variable data to the client device and the first set of program code, wherein the web page, when displayed by the client device, includes web content personalized for the target user, the web content personalized for the target user based on the transmitted portion of the variable data and comprising the selected personalized content insertion;
   receiving data indicating activity of the target user comprising a record of at least one visited web page that initiated from the web page and one or more of a frequency of visiting at least one visited web page, a length of time spent on the at least one visited web page, or both;
   determining the at least one visited web page comprises a conversion URL that, when accessed by the client device from the web page, indicates that the target user has been converted by the web page to access the conversion URL and make a purchase of an item; and
   transmitting, based on determining the at least one visited web page comprises the conversion URL, a message to a content provider of the web content personalized for the target user comprising data indicative of the target user making the purchase using the conversion URL.

13. The method of claim 12, further comprising:
   inserting the first set of program code into a set of web page code that, when executed by the client device, causes the client device to display the web page; and
   transmitting the set of web page code to the client device.

14. The system of claim 1, wherein the at least one processor is further configured to:
   insert the first set of program code into a set of web page code that, when executed by the client device, causes the client device to display the web page; and
   transmit the set of web page code to the client device.

15. The method of claim 7, further comprising:
   inserting the first set of program code into a set of web page code that, when executed by the client device, causes the client device to display the web page; and
   transmitting the set of web page code to the client device.

* * * * *